(12) United States Patent
Shim et al.

(10) Patent No.: US 9,355,025 B2
(45) Date of Patent: May 31, 2016

(54) METHOD OF CONTROLLING MEMORY SYSTEM IN THE EVENT OF SUDDEN POWER OFF

(71) Applicants: Gyu-Dong Shim, Hwaseong-si (KR); Won-Moon Cheon, Hwaseong-si (KR); Min-Wook Jung, Busan (KR)

(72) Inventors: Gyu-Dong Shim, Hwaseong-si (KR); Won-Moon Cheon, Hwaseong-si (KR); Min-Wook Jung, Busan (KR)

(73) Assignee: SAMSUNG ELECTRONICS CO., LTD., Samsung-ro, Yeongtong-gu, Suwon-si, Gyeonggi-do (KR)

( * ) Notice: Subject to any disclaimer, the term of this patent is extended or adjusted under 35 U.S.C. 154(b) by 305 days.

(21) Appl. No.: 13/737,308

(22) Filed: Jan. 9, 2013

(65) Prior Publication Data

US 2013/0179629 A1 Jul. 11, 2013

(30) Foreign Application Priority Data

Jan. 9, 2012 (KR) .......................... 10-2012-0002524

(51) Int. Cl.
*G06F 12/00* (2006.01)
*G06F 12/02* (2006.01)
*G06F 11/14* (2006.01)
*G06F 1/28* (2006.01)
*G06F 11/07* (2006.01)
*G06F 1/24* (2006.01)

(52) U.S. Cl.
CPC .............. *G06F 12/0246* (2013.01); *G06F 1/24* (2013.01); *G06F 1/28* (2013.01); *G06F 11/073* (2013.01); *G06F 11/0757* (2013.01); *G06F 11/1441* (2013.01); *G06F 2212/7203* (2013.01); *G06F 2212/7205* (2013.01); *G06F 2212/7208* (2013.01); *Y02B 60/1225* (2013.01)

(58) Field of Classification Search
CPC .. G06F 12/0246; G06F 12/0638; G06F 12/02
See application file for complete search history.

(56) References Cited

U.S. PATENT DOCUMENTS

| | | | |
|---|---|---|---|
| 7,457,897 B1 * | 11/2008 | Lee et al. ........................ | 710/74 |
| 7,610,445 B1 * | 10/2009 | Manus et al. .................. | 711/113 |
| 2006/0282686 A1 * | 12/2006 | Bahali et al. .................. | 713/300 |
| 2009/0049222 A1 * | 2/2009 | Lee et al. ....................... | 710/300 |
| 2009/0061952 A1 * | 3/2009 | Wu ........................ | H04W 52/60 455/572 |
| 2011/0058440 A1 * | 3/2011 | Smith et al. .................... | 365/229 |
| 2011/0060927 A1 * | 3/2011 | Fillingim et al. ............. | 713/320 |
| 2011/0113184 A1 * | 5/2011 | Chu .............................. | 711/103 |
| 2011/0185145 A1 * | 7/2011 | Moro ............................ | 711/167 |
| 2012/0151118 A1 * | 6/2012 | Flynn et al. ...................... | 711/6 |

FOREIGN PATENT DOCUMENTS

| | | |
|---|---|---|
| JP | 2005-025401 | 1/2005 |
| KR | 2004-0059015 | 7/2004 |
| KR | 2010-00027441 | 3/2010 |
| WO | 2009/107507 | 9/2009 |

* cited by examiner

*Primary Examiner* — Kevin Verbrugge
*Assistant Examiner* — Arvind Talukdar
(74) *Attorney, Agent, or Firm* — Muir Patent Law, PLLC (57) ABSTRACT

A method of controlling a memory system that comprises a first flash memory device and a memory controller, the method comprising counting a first timeout when a sudden power off occurs, resetting the first flash memory device when the first timeout expires, and dumping data to the first flash memory device.

20 Claims, 7 Drawing Sheets

METHOD OF CONTROLLING MEMORY SYSTEM IN THE EVENT OF SUDDEN POWER OFF

CROSS-REFERENCE TO RELATED APPLICATIONS

This application claims priority under 35 U.S.C. §119 from Korean Patent Application No. 10-2012-0002524 filed on Jan. 9, 2012 in the Korean Intellectual Property Office, the disclosure of which is incorporated herein by reference in its entirety.

BACKGROUND OF THE INVENTION

1. Field of the Invention

The present inventive concept relates to a method of controlling a memory system in the event of a sudden power off.

2. Description of the Related Art

While a memory system is operating, a sudden power off, which is an abrupt power loss, may occur due to an unexpected power failure. The sudden power off leads to an external power off. However, since the memory system includes an auxiliary power device such as a super capacitor, it can be driven by the auxiliary power stored in the auxiliary power device. While being driven by the auxiliary power, the memory system may complete operations being performed by flash memory devices and dump necessary data to the flash memory devices. After the completion of the dump operation, the memory system may terminate all operations by cutting off the internal power supply (internal power off).

The memory system may include multiple flash memory devices, and the flash memory devices may be performing various operations when a sudden power off occurs. Here, the time required for the flash memory devices to complete an erase operation may be relatively longer than the time required to complete a read operation or a program operation. If a flash memory device starts to perform the erase operation at the same time as when a sudden power off occurs, since it requires a considerable amount of time to complete the erase operation, a power off time, which is the time required for the memory system to terminate all operations by cutting off the internal power supply after the occurrence of the sudden power off can be increased.

However, it is desirable to minimize the power off time because the amount of auxiliary power stored in the auxiliary power device is limited.

SUMMARY OF THE INVENTION

Features and utilities of the present inventive concept provide a method of controlling a memory system, in which a memory system counts a timeout when a sudden power off occurs and resets a flash memory device when the timeout expires to forcibly terminate an operation being performed by the flash memory device, thereby minimizing the time required for the memory system to terminate all operations by cutting off internal power supply after the occurrence of the sudden power off.

However, features and utilities of the present inventive concept are not restricted to the one set forth herein. The above and other features and utilities of the present inventive concept will become more apparent to one of ordinary skill in the art to which the present inventive concept pertains by referencing the detailed description of the present inventive concept given below.

According to features and utilities of the present inventive concept, there is provided a method of controlling a memory system that includes a first flash memory device and a memory controller, the method including counting a first timeout when a sudden power off occurs, resetting the first flash memory device when the first timeout expires, and dumping data to the first flash memory device.

A maximum time allowed for the first flash memory device to perform a read operation is a first time, and a maximum time allowed for the first flash memory device to perform a program operation is a second time, and wherein the first timeout is set to a time longer than a longer one of the first time and the second time. A maximum time allowed for the first flash memory device to perform an erase operation is a third time, wherein the first timeout is set to a time shorter than the third time.

The first flash memory device performs a first operation while the first timeout is counted, wherein the first operation is not completed when the first timeout expires. The first operation comprises the erase operation.

The memory system further comprises a second flash memory device and the method further comprises counting a second timeout while dumping the data to the first flash memory device and dumping the data to the second flash memory device when the dumping of the data to the first flash memory device is not completed until the second timeout expires.

The second timeout is set in view of an average time required for one of the first and second flash memory devices to perform the program operation.

The dumping of the data is performed after a reset completion signal is received from the first flash memory device.

The memory controller comprises a queue in which operations to be performed by the first flash memory device are queuing and the method further comprises aborting the operations in the queue while counting the first timeout when the sudden power off occurs.

The memory controller comprises a voltage comparator, wherein the voltage comparator determines that the sudden power off has occurred when a voltage applied to the memory system is lower than a reference voltage.

The memory system further comprises a second flash memory device, wherein the second flash memory device is not reset when the first timeout expires. The second flash memory device performs a second operation while the first timeout is counted, and wherein the second operation is completed before the first timeout expires.

According to other features and utilities of the present inventive concept, there is provided a method of controlling a memory system that includes a plurality of flash memory devices and a memory controller, the method including counting a first timeout when a sudden power off occurs, resetting some of the flash memory devices which are performing operations when the first timeout expires, and dumping data to at least one of the flash memory devices.

The operations being performed by the some of the flash memory devices comprise an erase operation.

A maximum time allowed for the flash memory devices to perform a read operation is a first time, a maximum time allowed for the flash memory devices to perform a program operation is a second time, and a maximum time allowed for the flash memory devices to perform the erase operation is a third time, and wherein the first timeout is set to a time which is longer than a longer one of the first time and the second time and is shorter than the third time.

According to other features and utilities of the present inventive concept, there is provided a method of controlling a memory system that includes a memory controller and a flash memory device unit including a first flash memory device, the method including counting a first timeout while performing operations by the flash memory device unit when a sudden poweroff occurs, and resetting the first flash memory device before a first operation performed by the first flash memory device is completed when the first timeout expires.

The flash memory device unit further includes a second flash memory device, and wherein a second operation performed by the second flash memory device is completed before the first timeout expires. The first operation is an erase operation and the second operation is one of a read operation and a program operation.

The method further includes counting a second timeout while dumping data to the first and second flash memory devices after the first timeout expires, and if the dumping of the data to at least one of the first and second flash memory devices is not completed when the second timeout expires, resetting the at least one of the first and second flash memory devices. The method further includes, if the at least one of the first and second flash memory devices is reset, performing an additional dump operation to complete the dumping of the data after the second timeout expires.

BRIEF DESCRIPTION OF THE DRAWINGS

The above and other features and utilities and features of the present inventive concept will become more apparent and more readily appreciated from the following description of the embodiments, taken in conjunction with the accompanying drawings of which.

DETAILED DESCRIPTION OF THE PREFERRED EMBODIMENTS

Advantages and features of the present inventive concept and methods of accomplishing the same may be understood more readily by reference to the following detailed description of preferred embodiments and the accompanying drawings, wherein like reference numerals refer to the like elements throughout. The embodiments are described below in order to explain the present general inventive concept while referring to the figures. The present inventive concept may, however, be embodied in many different forms and should not be construed as being limited to the embodiments set forth herein. Rather, these embodiments are provided so that this disclosure will be thorough and complete and will fully convey the concept of the inventive concept to those skilled in the art, and the present inventive concept will only be defined by the appended claims. In the drawings, the thickness of layers and regions are exaggerated for clarity.

It will be understood that when an element or layer is referred to as being "connected to," or "coupled to" another element or layer, it can be directly connected to or coupled to another element or layer or intervening elements or layers may be present. In contrast, when an element is referred to as being "directly connected to" or "directly coupled to" another element or layer, there are no intervening elements or layers present. Like numbers refer to like elements throughout. As used herein, the term "and/or" includes any and all combinations of one or more of the associated listed items.

It will be understood that, although the terms first, second, etc. may be used herein to describe various elements, these elements should not be limited by these terms. These terms are only used to distinguish one element from another element. Thus, for example, a first element, a first component or a first section discussed below could be termed a second element, a second component or a second section without departing from the teachings of the present inventive concept.

The terminology used herein is for the purpose of describing particular embodiments only and is not intended to be limiting of the inventive concept. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Figure 1:
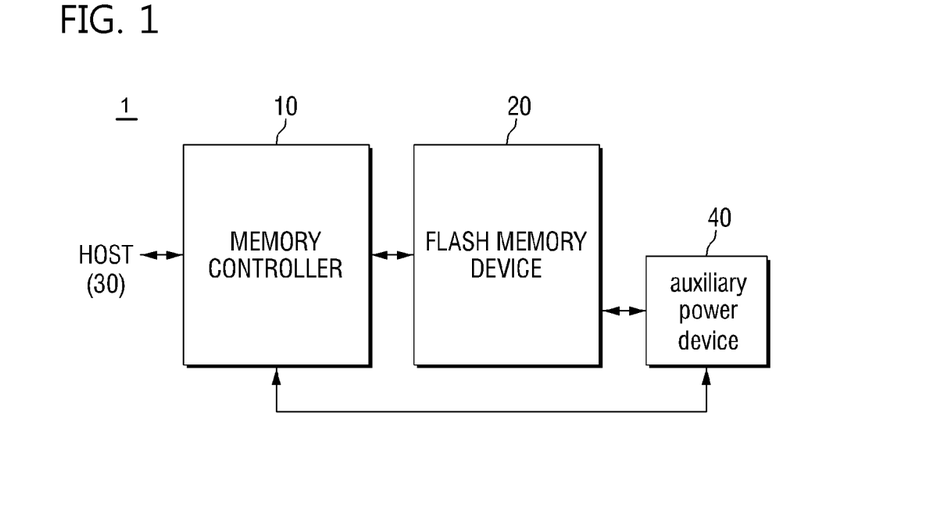
FIG. 1 is a block diagram illustrating a memory system according to some embodiments of the present inventive concept.
Figure 2:
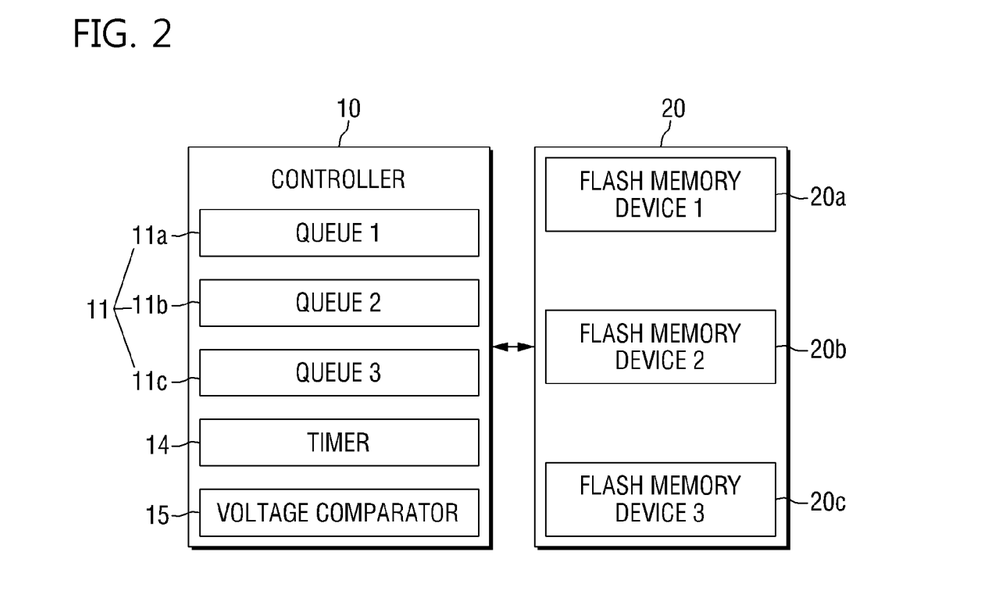
FIG. 2 is a detailed block diagram illustrating the memory system shown in FIG. 1.

A memory system according to some embodiments of the present inventive concept will be described with reference to FIGS. 1 and 2. FIG. 1 is a block diagram illustrating a memory system 1 according to some embodiments of the present inventive concept. FIG. 2 is a detailed block diagram illustrating the memory system 1 shown in FIG. 1.

Referring to FIGS. 1 and 2, the memory system 1 may include a memory controller 10 and one or more flash memory devices 20.

The memory controller 10 and the flash memory devices 20 may be integrated into one semiconductor device to comprise a solid state drive (SSD). However, the present inventive concept is not limited thereto. Alternatively, the memory controller 10 and the flash memory device 20 may be implemented as separate semiconductor devices.

The memory controller 10 is connected to a host 30 and the flash memory devices 20. The memory controller 10 is configured to access the flash memory devices 20 in response to a request from the host 30. For example, the memory controller 10 may be configured to control operations of the flash memory devices 20. The operations performed by the flash memory devices 20 may include a read operation, a program operation, and an erase operation. The memory controller 10 may be configured to provide an interface between the flash memory devices 20 and the host 30. The memory controller 10 may be configured to drive firmware for controlling the flash memory devices 20.

Specifically, the memory controller 10 may include queues 11, a timer 14, and a voltage comparator 15. Operations to be performed by the flash memory devices 20 may queue in the queues 11. The queues 11 may include, for example, first through third queues 11a through 11c. However, the number of the queues 11 is not limited to the three queues as illustrated in FIG. 2. For ease of description, it may be defined that the first through third queues 11a through 11c store operations to be performed by first through third flash memory devices 20a through 20c, respectively. However, the present inventive concept is not limited to this configuration, and also the number of the flash memory devices is not limited to the three flash memory devices as illustrated in FIG. 2.

The timer 14 may set a timeout needed to control the flash memory devices 20. In addition, the timer 14 may count the set timeout and provide information about whether the timeout has expired.

The voltage comparator 15 may compare a voltage applied to the memory system 1 with a reference voltage. When the comparison result of the voltage comparator 15 indicates that the voltage applied to the memory system 1 is lower than the reference voltage, the memory controller 10 may determine that a sudden power off has occurred. The sudden power off refers to an abrupt power loss. The sudden power off may occur due to an external power off resulting from an unexpected power failure, for example.

The flash memory devices 20 may be, but are not limited to, NAND flash memory devices. The number of the flash memory devices 20 is not limited a specific number. In FIG. 2, an exemplary embodiment where the flash memory devices 20 include the first through third flash memory devices 20a through 20c is illustrated for ease of description. As described above, the flash memory devices 20 connected to the memory controller 10 are controlled by the memory controller 10. Specifically, all of the first through third flash memory devices 20a through 20c may be controlled by the memory controller 10.

Figure 3:
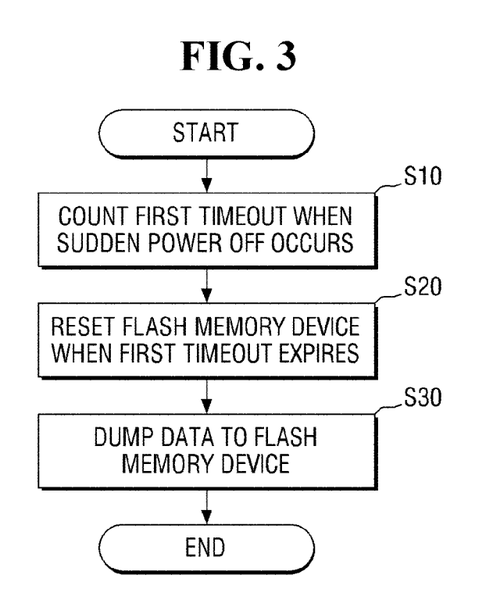
FIG. 3 is a flowchart illustrating a method of controlling a memory system in the event of a sudden power off according to a first embodiment of the present inventive concept.
Figure 4:
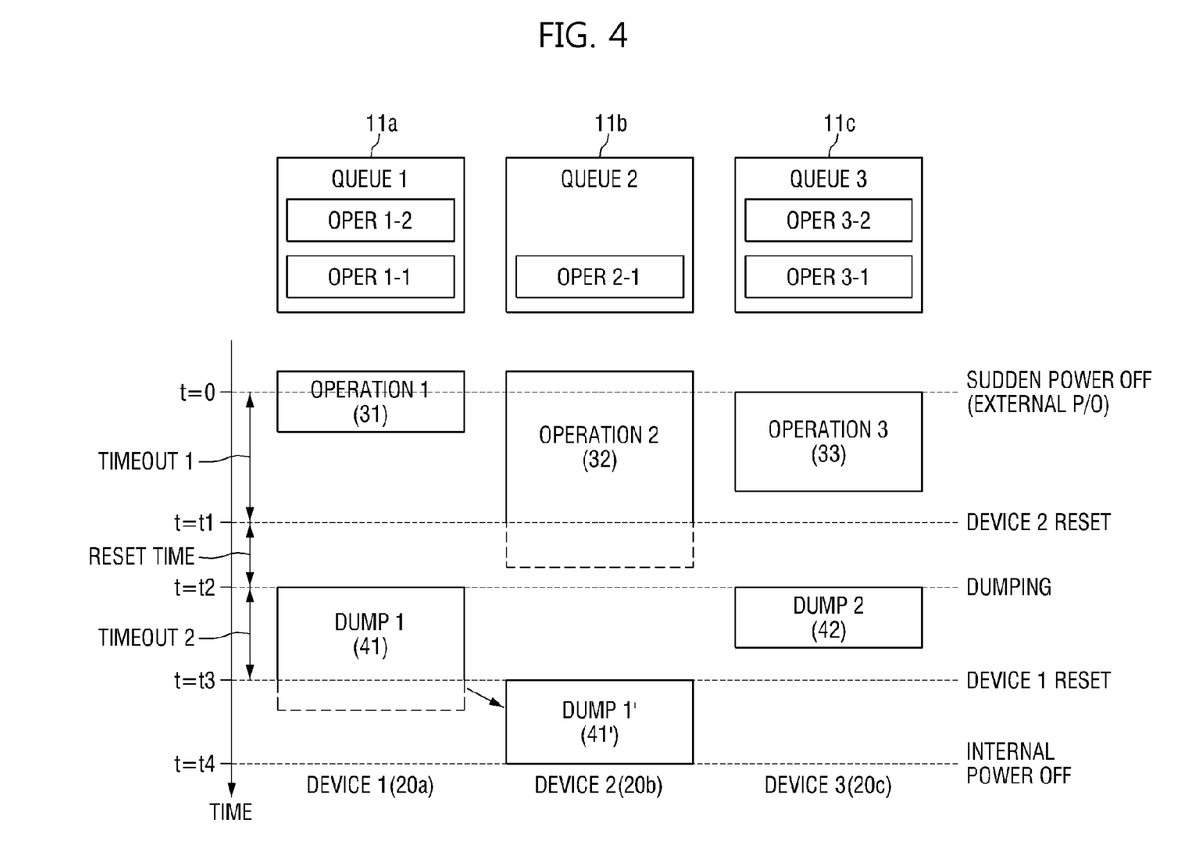
FIG. 4 is a timing diagram illustrating the method of controlling a memory system in the event of a sudden power off according to the first embodiment of the present inventive concept.
Figure 5:
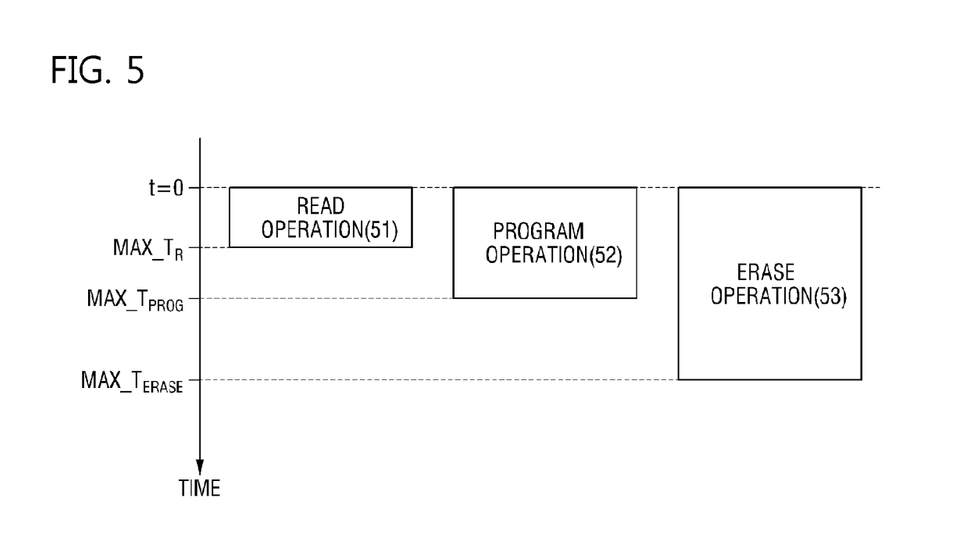
FIG. 5 is a timing diagram illustrating the time taken for a flash memory device to perform each operation.
Figure 6:
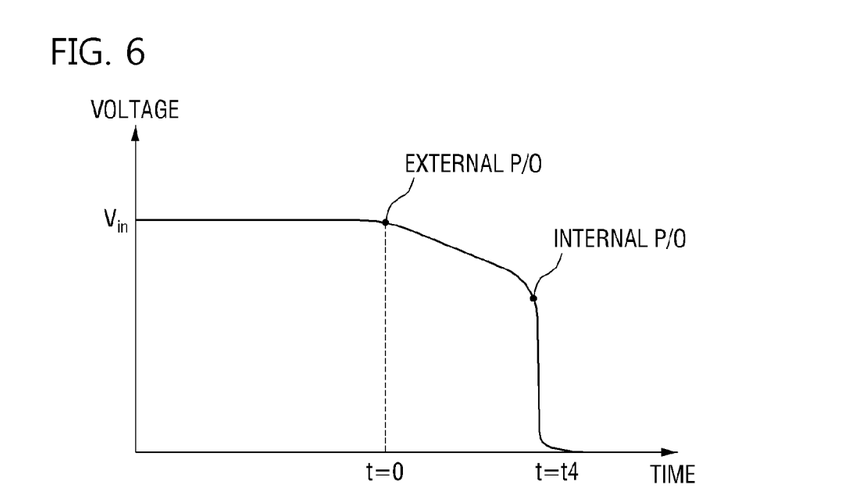
FIG. 6 is a timing diagram illustrating a sudden power off.

A method of controlling a memory system in the event of a sudden power off according to a first embodiment of the present inventive concept will be described with reference to FIGS. 1 through 6. FIG. 3 is a flowchart illustrating a method of controlling a memory system in the event of a sudden power off according to a first embodiment of the present inventive concept. FIG. 4 is a timing diagram illustrating the method of controlling a memory system in the event of a sudden power off according to the first embodiment of the present inventive concept. FIG. 5 is a timing diagram illustrating the time taken for a flash memory device to perform each operation. FIG. 6 is a timing diagram illustrating a sudden power off.

Referring to FIG. 6, an external power off caused by an unexpected power failure may result in a sudden power off. FIG. 6 illustrates a plot of an input voltage Vin for the memory system with respect to time. A time when the sudden power off occurs may be defined as t0. A memory system 1 includes an auxiliary power device 40 such as a super capacitor, as illustrated in FIG. 1. Thus, even when the external power supply to the memory system 1 is interrupted by the sudden power off, the memory system 1 can operate for a limited period of time using auxiliary power stored in the auxiliary power device 40. As illustrated in FIG. 6, even after the sudden power off at t0 (at External P/O), the memory system 1 may be supplied with power from the auxiliary power device 40 until the time reaches t4 (at Internal P/O).

For the limited period of time, the memory system 1 may be controlled as follows according to the first embodiment of the present inventive concept.

Referring to FIGS. 2 through 4, when a sudden power off occurs, a first timeout TIMEOUT 1 is counted (operation S10).

When the sudden power off occurs at t0, a memory controller 10 may start to count the set first timeout TIMEOUT 1.

At this time, the memory controller 10 may also abort I/O (Input/Output) operations that are to be performed by the flash memory devices 20. Specifically, the memory controller 10 may abort all operations in queues 11 in order to reduce power consumption. For example, $(1-1)^{th}$ and $(1-2)^{th}$ operations which are to be performed by a first flash memory device 20a are in the first queue 11a. In addition, a $(2-1)^{th}$ operation is in the second queue 11b, and $(3-1)^{th}$ and $(3-2)^{th}$ operations are in the third queue 11c. When the sudden power off occurs, all of the operations in the first through third queues 11a through 11c may be aborted.

However, operations that are to be performed by the flash memory devices 20 when the sudden power off occurs or operations that the flash memory devices 20 start to perform at the same time as when the sudden power off occurs may continuously be performed. For example, as illustrated in FIG. 4, a first operation 31 and a second operation 32 are being performed respectively by the first flash memory device 20a and the second flash memory device 20b when the sudden power off occurs at t0. Therefore, the first and second operations 31 and 32 may be continuously performed without being aborted after the sudden power off occurs at t0. In addition, as illustrated in FIG. 4, the third flash memory device 20c starts to perform a third operation 33 at the same time as when the sudden power off occurs at t0. Therefore, the third operation may also be continuously performed without being aborted.

The first timeout TIMEOUT 1 will now be described in detail with reference to FIGS. 4 and 5.

Referring to FIGS. 4-5, a maximum time allowed for the flash memory devices 20 to perform a read operation 51 may be defined as $MAX\_T_R$. In addition, maximum times allowed for the flash memory devices 20 to perform a program operation 52 and an erase operation 53 may be defined as $MAX\_T_{PROG}$ and $MAX\_T_{ERASE}$, respectively. For example, $MAX\_T_{ERASE}$ may be longest, and $MAX\_T_R$ may be shortest, as illustrated in FIG. 5.

The first timeout TIMEOUT 1 may be set to a sufficient period of time during which the read operation 51 and the program operation 52 being performed by the flash memory devices 20 can be completed while the first timeout TIMEOUT 1 is counted. However, the first timeout TIMEOUT 1 may be set regardless of whether or not the erase operation being performed by the flash memory devices 20 can be completed while the first timeout TIMEOUT 1 is counted. Thus, $MAX\_T_{ERASE}$ may not affect setting of the first timeout TIMEOUT 1.

In summary, the first timeout TIMEOUT 1 may be set to a time which is longer than a longer one of $MAX\_T_R$ and $MAX\_T_{PROG}$ but is shorter than $MAX\_T_{ERASE}$.

More specifically, the first timeout TIMEOUT 1 may be set to a time longer than a longer one of $MAX\_T_{R\_MSB}$ and MAX_T$_{PROG\_MSB}$. Then, this first timeout TIMEOUT 1 may be long enough to allow both the read operation 51 and the program operation 52 to be completed. However, the first timeout TIMEOUT 1 may still be set to a time shorter than MAX_T$_{ERASE}$. MAX_T$_{R\_MSB}$ and MAX_T$_{PROG\_MSB}$ may respectively be defined as maximum times allowed for the flash memory devices 20 to perform the read operation and the program operation of a most significant bit (MSB). The maximum times allowed for the read operation and the program operation of the MSB may be longer than maximum times allowed for the read operation and the program operation of a least significant bit (LSB). Therefore, the first timeout TIMEOUT 1 can also be set using MAX_T$_{R\_MSB}$ and MAX_T$_{PROG\_MSB}$.

Consequently, while the first timeout TIMEOUT 1 is counted, the read operation and the program operation being performed by the flash memory devices 20 can be completed. However, while the first timeout TIMEOUT 1 is counted, the erase operation being performed by the flash memory devices 20 may not be completed in some cases, such as a case where MAX_T$_{PROG}$ and MAX_T$_{ERASE}$ is shorter than MAX_T$_{ERASE}$.

For example, referring to FIGS. 2 and 4, while the first timeout TIMEOUT 1 is counted, the first operation 31 being performed by the first flash memory device 20a and the third operation 33 being performed by the third flash memory device 20c can be completed. Therefore, each of the first and third operations 31 and 33 may be any one of the read operation and the program operation.

On the other hand, as illustrated in FIG. 4, the second operation 32 being performed by the second flash memory device 20b is not completed while the first timeout TIMEOUT 1 is counted. Therefore, the second operation 32 may be the erase operation that is not completed when the first timeout TIMEOUT 1 expires.

Referring to FIGS. 2 through 4, when the first timeout TIMEOUT 1 expires, the flash memory devices 20 are reset (operation S20).

Specifically, when the first timeout TIMEOUT 1 expires at t1, some of the flash memory devices 20 which are performing operations may be reset. Resetting some of the flash memory devices 20 may result in forced termination of operations being performed by the reset flash memory devices 20. Here, since the first timeout TIMEOUT 1 was set to allow a sufficient time for the read operation and the program operation to be completed but not for the erase operation to be completed, those flash memory devices 20 which are performing the erase operation may be reset, but those flash memory devices 20 which are performing the read operation and the program operation may not be reset.

For example, referring to FIG. 4, at the time t1 when the first timeout TIMEOUT 1 expires, the second flash memory device 20b is still performing the second operation 32 and has not completed the second operation 32. Thus, the second flash memory device 20b may be reset at the time t1. The resetting of the second flash memory device 20b may result in forced termination of the second operation 32. Accordingly, the second operation 32 is no longer performed in a section between t1 and t2. After being reset, the second flash memory device 20b may be ready to receive a new command from the memory controller 10 and perform a new operation.

On the other hand, some flash memory devices 20 (e.g., the first and third flash memory devices 20a and 20c) are not performing operations at the time t1 when the first timeout TIMEOUT 1 expires since they have already completed their operations before the expiration of the first timeout TIMEOUT 1, and thus these flash memory devices 20 (e.g., the first and third flash memory devices 20a and 20c) may not be reset.

As described above, the section between t1 and t2 is a section in which the second flash memory device 20b is reset. A reset time may be defined as a period of time from a time when the memory controller 10 instructs a flash memory device 20 to be reset to a time when the memory controller 10 receives a reset completion signal from the flash memory device 20.

After the first timeout TIMEOUT 1 expires and some of the flash memory devices 20 are reset during the reset time, all flash memory devices 20 can be ready to receive new commands from the memory controller 10 and perform new operations.

In summary, in the method of controlling a memory system in the event of a sudden power off according to the first embodiment of the present inventive concept, when the sudden power off occurs, the first timeout TIMEOUT 1 is counted. When the first timeout TIMEOUT 1 expires, the flash memory devices 20 which are performing operations at the time t1 are reset in order to forcibly terminate the operations being performed by the flash memory devices 20. That is, after the first time out TIMEOUT 1, the memory system 1 moves to a next step without waiting until all operations are completed. Thus, this can reduce a power off time, which is the time required to terminate all operations by cutting off the internal power supply to the memory system 1 after the occurrence of a sudden power off.

In particular, the first timeout TIMEOUT 1 is set to a time longer than a longer one of MAX_T$_R$ and MAX_T$_{PROG}$ and shorter than MAX_T$_{ERASE}$. Therefore, a sufficient period of time during which both of the read and program operations being performed by the flash memory devices 20 can be completed is secured before the first timeout TIMEOUT 1 expires. An operation that is forcibly terminated when the first timeout TIMEOUT 1 expires may be the erase operation which requires a relatively long time to be completed. That is, the first timeout TIMEOUT 1 may be set such that flash memory devices 20 performing the erase operation can be reset, but the read and program operations can be completed.

Since the erase operation requires a longer time to be completed than the read and program operations, it may be a contributor to an increase in the power off time. Therefore, in the method of controlling a memory system in the event of a sudden power off according to the first embodiment of the present inventive concept, those flash memory devices 20 which are performing the erase operation are reset when the first timeout expires, thus effectively reducing the power off time.

Even if data is not completely erased from a flash memory device 20 due to the forced termination of the erase operation, since the data is not lost, the reliability of the memory system 1 is not significantly undermined. Therefore, resetting flash memory devices 20 which are performing the erase operation according to the method of the first embodiment of the present inventive concept can reduce the power off time without greatly undermining the reliability of the memory system 1.

Referring to FIGS. 2 through 4, data is dumped to the flash memory devices 20 (operation S30).

Specifically, after the resetting of some of the flash memory devices 20 is completed at t2, all flash memory devices 20 may be ready to receive new commands from the memory controller 10 and perform new operations. Then, the memory controller 10 may dump dump data to the flash memory devices 20. That is, after receiving reset completion signals from some of the flash memory devices 20, the memory controller 10 may program the dump data to the flash memory devices 20. The dump data may be at least one of, but not limited to, data failed to be programmed to a flash memory device 20, metadata, and dirt data stored in a cache of the memory controller 10.

The dump data may be stored in one or more of the flash memory devices 20 and may not necessarily be stored in all of the flash memory devices 20. In order to reduce the time required to program the dump data to a flash memory device 20, the memory controller 10 may secure a block of the flash memory devices 20 that is programmable without being erased. Therefore, the dump data may be programmed to the block secured in advance by the flash memory device 20.

In addition, to reduce the time required to program the dump data to a flash memory device 20, the dump data may be programmed to the LSB of the flash memory device 20. This is because the time required to program the dump data to the LSB of the flash memory device 20 is shorter than the time required to program the dump data to other bits of the flash memory device 20.

Specifically, referring to FIG. 4, first and second dump operations 41 and 42 may be performed by the first and third flash memory devices 20a and 20c, respectively. As a result, the dump data may be programmed to the first and third flash memory devices 20a and 20c. At t2, the memory controller 10 may start to count a set second timeout TIMEOUT 2, and the first and second flash memory devices 20a and 20c may start to perform the first and second dump operations 41 and 42.

The second timeout TIMEOUT 2 may be set in view of an average time required for the flash memory devices 20 to perform the program operation such as the program operation 52. Specifically, the second timeout TIMEOUT 2 may be set to $\alpha \cdot AVG\_T_{PROG}$ ($\alpha$ is equal to or greater than one). $AVG\_T_{PROG}$ may be defined as the average time required for the flash memory devices 20 to perform the program operation.

More specifically, the second timeout TIMEOUT 2 may be set to $\alpha \cdot AVG\_T_{PROG\_LSB}$ ($\alpha$ is equal to or greater than one). Here, $\alpha \cdot AVG\_T_{PROG\_LSB}$ may be defined as an average time required for the flash memory devices 20 to perform the program operation of the LSB. As described above, since the dump data may be programmed to the LSB of the flash memory devices 20 in order to reduce the time required to program the dump data to the flash memory devices 20, the second timeout TIMEOUT 2 may be set to $\alpha \cdot AVG\_T_{PROG\_LSB}$ ($\alpha$ is equal to or greater than one).

Some dump operation may be completed before the second timeout TIMEOUT 2 expires, whereas other dump operations may not yet be completed when the second timeout TIMEOUT 2 expires. In the example illustrated in FIG. 4, the second dump operation 42 performed by the third flash memory device 20c may be completed before the expiration of the second timeout TIMEOUT 2. However, the first dump operation 41 performed by the first flash memory device 20a may not be completed when the second timeout TIMEOUT 2 expires.

When the second timeout TIME 2 expires, the flash memory devices 20 may be reset.

Specifically, when the second timeout TIMEOUT 2 expires at t3, some of the flash memory devices 20 which are performing dump operations may be reset. Resetting some of the flash memory devices 20 may result in forced termination of dump operations being performed by the reset flash memory devices 20. The dump operations forcibly terminated may be performed again by other flash memory devices 20.

In the example illustrated in FIG. 4, the first dump operation 41 is not completed before the expiration of the second timeout TIMEOUT 2. Thus, while the second and third flash memory devices 20b and 20c may not be reset, the first flash memory device 20a may be reset at t3, resulting in forced termination of the first dump operation 41. However, an additional first dump operation 41' may be performed by the second flash memory device 20a at the same time t3 as when the first flash memory device 20a is reset. For example, the additional first dump operation 41' may be performed to complete the first dump operation 41 that has not been completed due to the forced termination of the first dump operation 41 at t3.

Consequently, the additional first dump operation 41' can be completed by the second flash memory device 20b at t4. After the completion of the additional first dump operation 41', the memory system 1 may terminate all operations by cutting off the internal power supply to the memory system 1.

In summary, in the method of controlling a memory system in the event of a sudden power off according to the first embodiment of the present inventive concept, the second timeout TIMEOUT 2 is counted while dump operations are performed. When the second timeout TIMEOUT 2 expires, flash memory devices 20 which are still performing the dump operations are reset in order to forcibly terminate the dump operations. That is, since the memory system 1 moves to a next step without waiting until receiving a signal that indicates the failure of completion of a dump operation, the power off time can be reduced.

In particular, the second timeout TIMEOUT 2 is set to $\alpha \cdot AVG\_T_{PROG}$ ($\alpha$ is equal to or greater than one). Therefore, unless a program failure occurs, a sufficient period of time during which dump operations can be completed by the flash memory devices 20 can be secured. Thus, it may be reasonable to consider a dump operation not completed during the second timeout TIMEOUT 2 as a failed dump operation. In the method of controlling a memory system in the event of a sudden power off according to the first embodiment of the present inventive concept, the failure of completion of a dump operation is determined in advance, a flash memory device 20 (performing the dump operation) is reset, and the dump operation is performed again by another flash memory device 20. Therefore, the power off time can be reduced effectively.

Figure 7:
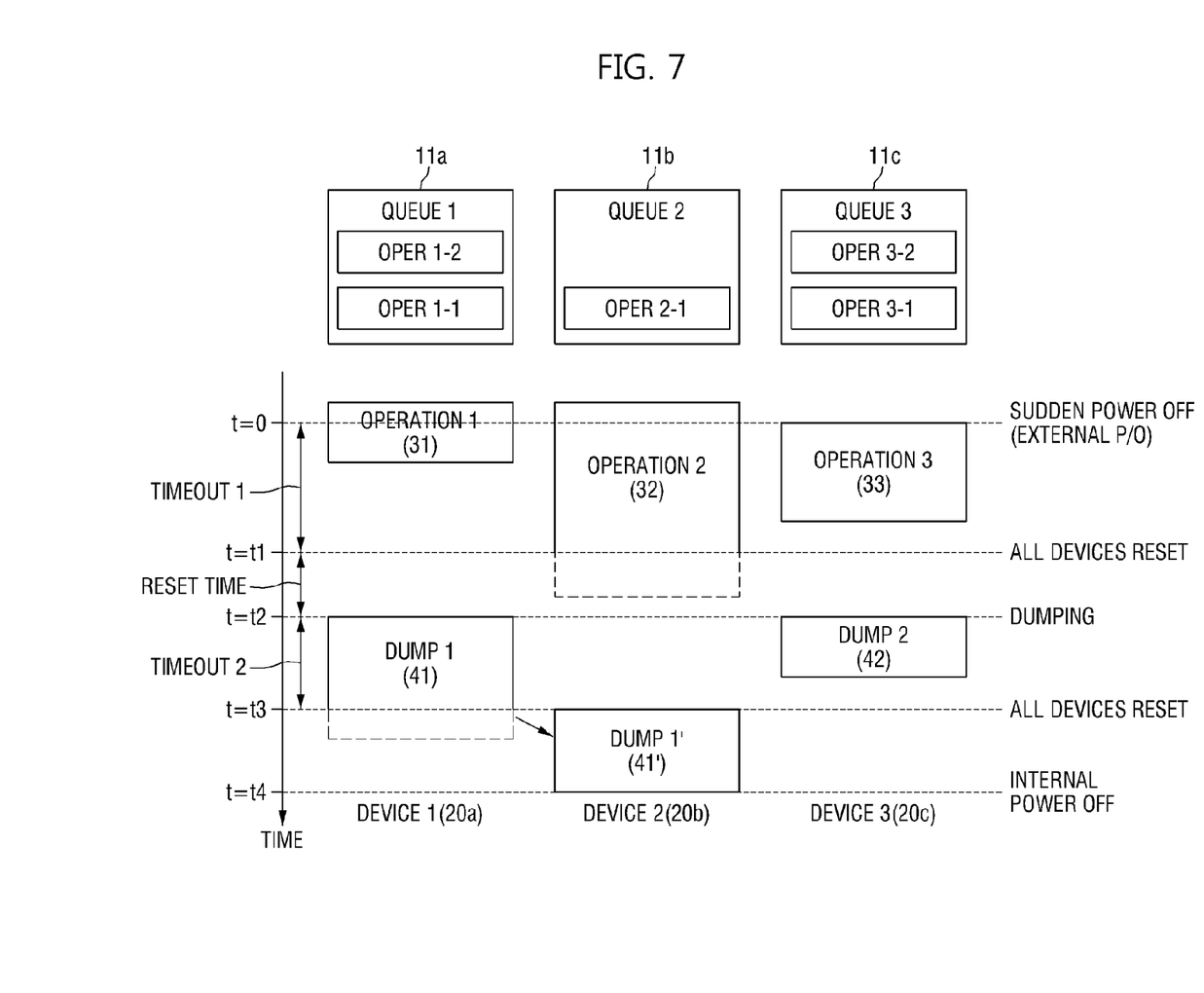
FIG. 7 is a timing diagram illustrating a method of controlling a memory system in the event of a sudden power off according to a second embodiment of the present inventive concept.

A method of controlling a memory system in the event of a sudden power off according to a second embodiment of the present inventive concept will be described with reference to FIG. 7. For simplicity, the following description will focus on differences from the method of controlling a memory system in the event of a sudden power off according to the first embodiment of the present inventive concept illustrated in FIG. 4. The difference between the first embodiment illustrated in FIG. 4 and the second embodiment illustrated in FIG. 7 is that at the time t1 and at the time t3, the first embodiment resets only one of the devices whereas the second embodiment resets all devices. FIG. 7 is a timing diagram illustrating a method of controlling a memory system in the event of a sudden power off according to a second embodiment of the present inventive concept.

Referring to FIG. 7, in the method of controlling a memory system in the event of a power off according to the second embodiment of the present inventive concept, all flash memory devices 20 may be reset after a first timeout TIMEOUT 1 expires and after a second timeout TIMEOUT 2 expires. That is, all flash memory devices 20, not some of the flash memory devices 20 which are performing operations, may be reset when the first timeout TIMEOUT 1 expires or when the second timeout TIMEOUT 2 expires.

Figure 8:
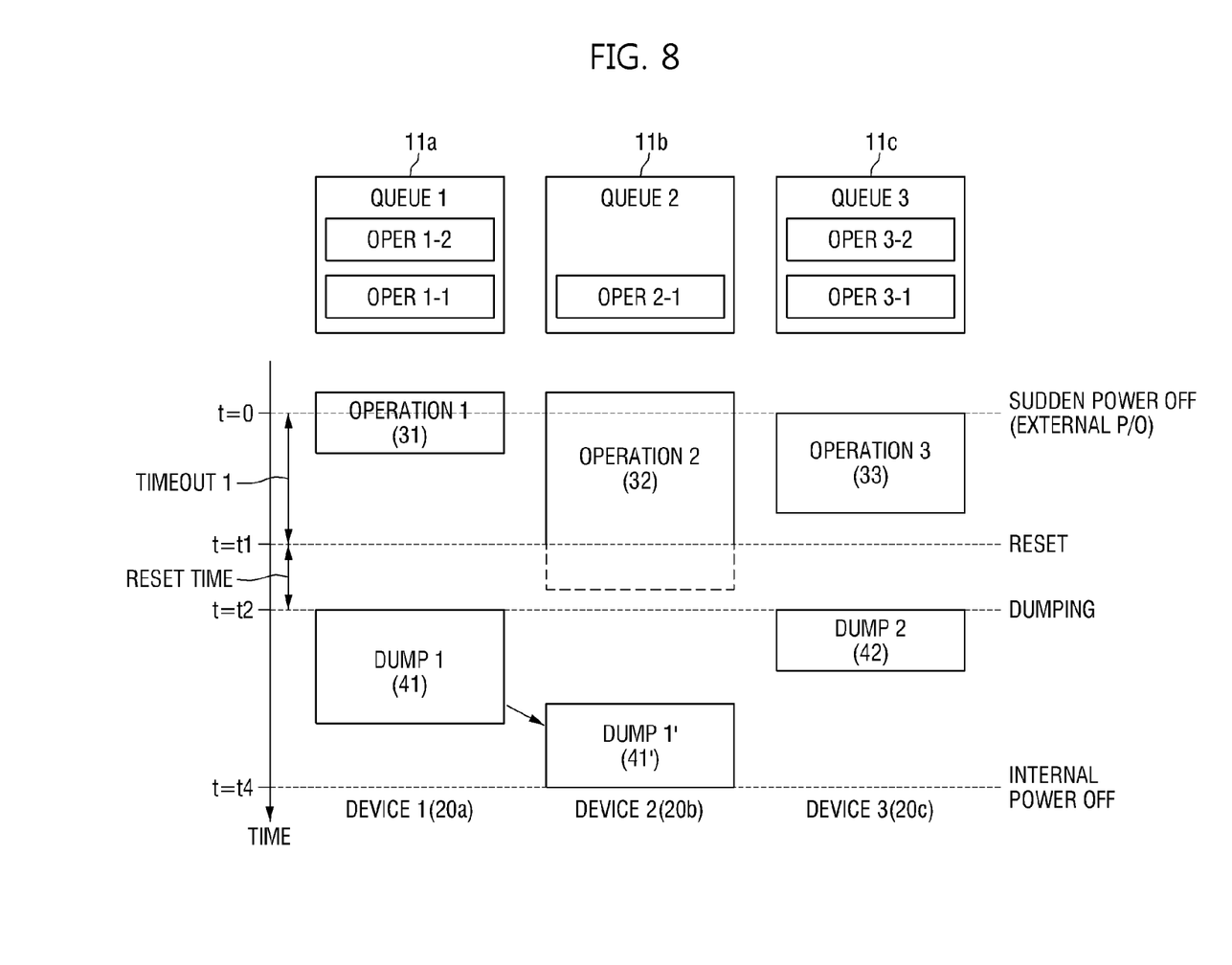
FIG. 8 is a timing diagram illustrating a method of controlling a memory system in the event of a sudden power off according to a third embodiment of the present inventive concept.

A method of controlling a memory system in the event of a sudden power off according to a third embodiment of the present inventive concept will be described with reference to FIG. 8. For simplicity, the following description will focus on differences from the method of controlling a memory system in the event of a sudden power off according to the first embodiment of the present inventive concept. The difference between the first embodiment illustrated in FIG. 4 and the second embodiment illustrated in FIG. 8 is that the first embodiment resets device 1 at the time t3 after the second timeout TIMEOUT 2 whereas the third embodiment does not reset any device between the time t2 and the time t4. FIG. 8 is a timing diagram illustrating a method of controlling a memory system in the event of a sudden power off according to a third embodiment of the present inventive concept.

Referring to FIG. 8, in the method of controlling a memory system in the event of a sudden power off according to the third embodiment of the present inventive concept, a reset operation performed at a point between the time t2 and the time t4 may be omitted, and there may be no second timeout TIMEOUT 2. Specifically, an additional first dump operation 41' may be performed by a second flash memory device 20b only after a signal indicating the failure of completion of a first dump operation by a first flash memory device 20a is received.

Figure 9:
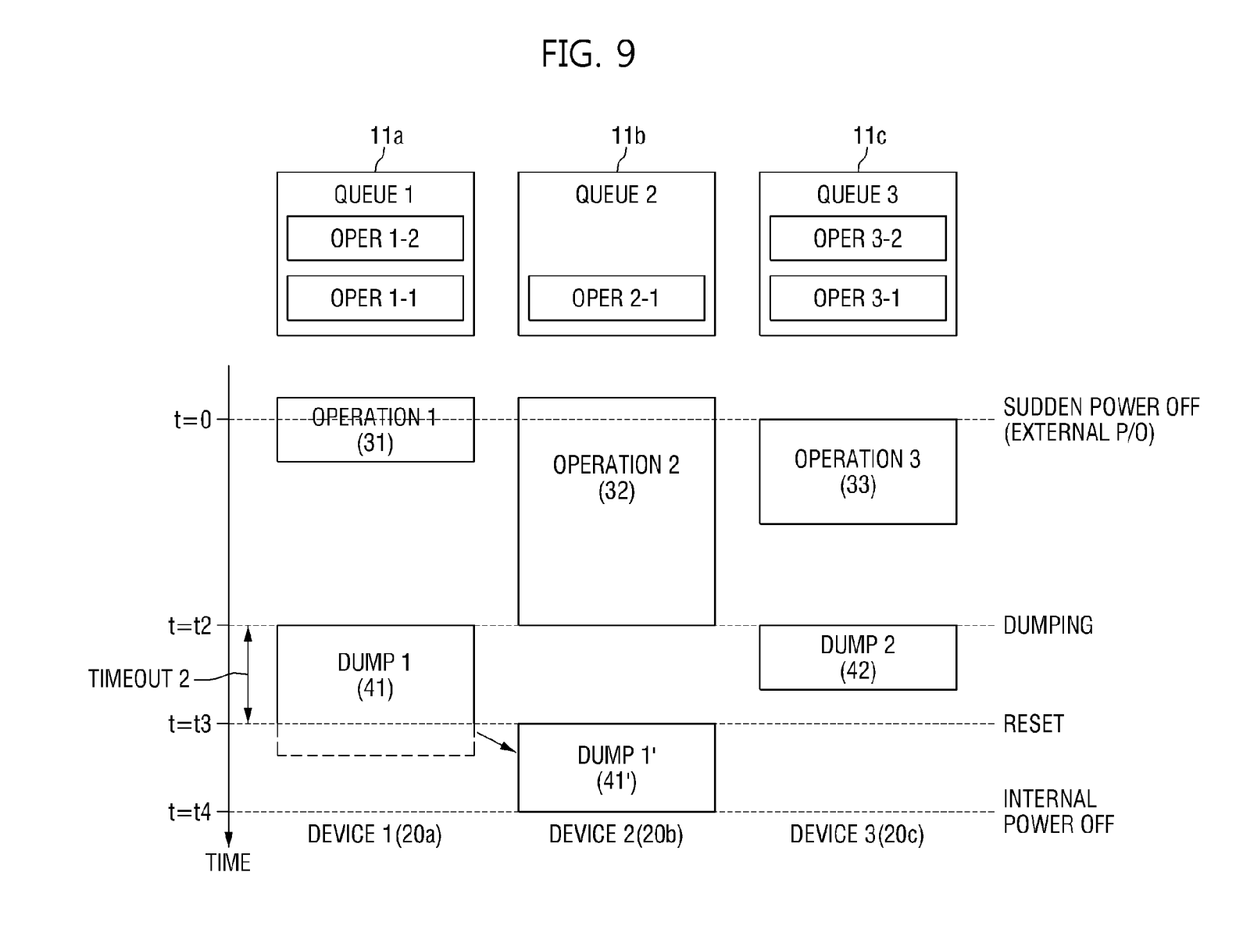
FIG. 9 is a timing diagram illustrating a method of controlling a memory system in the event of a sudden power off according to a fourth embodiment of the present inventive concept.

A method of controlling a memory system in the event of a sudden power off according to a fourth embodiment of the present inventive concept will be described with reference to FIG. 9. For simplicity, the following description will focus on differences from the method of controlling a memory system in the event of a sudden power off according to the first embodiment of the present inventive concept. The difference between the first embodiment illustrated in FIG. 4 and the second embodiment illustrated in FIG. 9 is that the first embodiment resets device 2 at the time t1 after the first timeout TIMEOUT 1 whereas the fourth embodiment does not reset any device between the time t0 and the time t2. FIG. 9 is a timing diagram illustrating a method of controlling a memory system in the event of a sudden power off according to a fourth embodiment of the present inventive concept.

Referring to FIG. 9, in the method of controlling a memory system in the event of a sudden power off according to the fourth embodiment of the present inventive concept, a reset operation performed at a point between the time t0 and the time t2 may be omitted, and there may be no first timeout TIMEOUT 1. Specifically, a data dump operation may be performed after all operations are completed.

While the present general inventive concept has been particularly shown and described with reference to exemplary embodiments thereof, it will be understood by those of ordinary skill in the art that various changes in form and details may be made therein without departing from the spirit and scope of the present general inventive concept as defined by the following claims. It is therefore desired that the present embodiments be considered in all respects as illustrative and not restrictive, reference being made to the appended claims rather than the foregoing description to indicate the scope of the invention.

What is claimed is:

1. A method of controlling a memory system that comprises a first flash memory device and a memory controller, the method comprising:
counting a first timeout in response to a sudden power off occurrence, the first timeout being less than an internal power off time corresponding to a time between a beginning of the power off occurrence and a time that an auxiliary power device ceases to supply the memory device with power;
resetting the first flash memory device in response to the first timeout expiring; and
dumping data to the first flash memory device after the resetting of the first flash memory in response to the first timeout expiring and prior to the internal power off time.

2. The method of claim 1, wherein a maximum time allowed for the first flash memory device to perform a read operation is a first time, a maximum time allowed for the first flash memory device to perform a program operation is a second time, and the first timeout is set to a time longer than a longer one of the first time and the second time.

3. The method of claim 2, wherein a maximum time allowed for the first flash memory device to perform an erase operation is a third time, and the first timeout is set to a time shorter than the third time.

4. The method of claim 1, wherein the first flash memory device performs a first operation while the first timeout is counted, the first operation is not completed when the first timeout expires, and the first flash memory device is reset based on determining that the first operation was not completed when the first timeout expired.

5. The method of claim 4, wherein the first operation comprises the erase operation.

6. The method of claim 1, wherein the memory system further comprises a second flash memory device, and the method further comprises:
counting a second timeout while dumping the data to the first flash memory device; and
dumping the data to the second flash memory device in response to the dumping of the data to the first flash memory device not being completed when the second timeout expires.

7. The method of claim 6, wherein the second timeout is set in view of an average time required for one of the first and second flash memory devices to perform the program operation.

8. The method of claim 1, wherein the dumping of the data is performed after a reset completion signal is received from the first flash memory device.

9. The method of claim 1, wherein the memory controller comprises a queue in which operations to be performed by the first flash memory device are queuing, and the method further comprises:
aborting the operations in the queue while counting the first timeout in response to the sudden power off occurrence.

10. The method of claim 1, wherein the memory controller comprises a voltage comparator, and the voltage comparator determines that the sudden power off has occurred in response to a voltage applied to the memory system being lower than a reference voltage.

11. The method of claim 1, wherein the memory system further comprises a second flash memory device, and the second flash memory device is not reset in response to the first timeout expiring.

12. The method of claim 11, wherein the second flash memory device performs a second operation while the first timeout is counted, and the second operation is completed before the first timeout expires.

13. A method of controlling a memory system that comprises a plurality of flash memory devices and a memory controller, the method comprising:
counting a first timeout in response to a sudden power off occurrence;
resetting some of the flash memory devices which are performing operations, in response to the first timeout expiring; and dumping data to at least one of the flash memory devices after the resetting the some of the first flash memory devices in response to the first time out expiring, the expiring of the first time out being prior to an internal power off time, and the internal power off time corresponding to a time between a beginning of the power off occurrence and a time that an auxiliary power device ceases to supply the memory device with power.

14. The method of claim 13, wherein the operations being performed by the some of the flash memory devices comprise an erase operation.

15. The method of claim 13, wherein a maximum time allowed for the flash memory devices to perform a read operation is a first time, a maximum time allowed for the flash memory devices to perform a program operation is a second time, and a maximum time allowed for the flash memory devices to perform the erase operation is a third time, and wherein the first timeout is set to a time which is longer than a longer one of the first time and the second time and is shorter than the third time.

16. A method of controlling a memory system that comprises a memory controller and a flash memory device unit including a first flash memory device, the method comprising:
counting a first timeout while performing operations by the flash memory device unit in response to a sudden power off occurrence, the first timeout having a duration less than an internal power off time corresponding to a time between a beginning of the power off occurrence and a time that an auxiliary power device ceases to supply the flash memory device with power; and
resetting the first flash memory device before a first operation performed by the first flash memory device is completed, in response to the first timeout expiring.

17. The method of claim 16, wherein the flash memory device unit further includes a second flash memory device, and a second operation performed by the second flash memory device is completed before the first timeout expires.

18. The method of claim 17, wherein the first operation is an erase operation and the second operation is one of a read operation and a program operation.

19. The method of claim 17, further comprising:
counting a second timeout while dumping data to the first and second flash memory devices after the first timeout expires; and
resetting the at least one of the first and second flash memory devices in response to the dumping of the data to at least one of the first and second flash memory devices not being completed when the second timeout expires.

20. The method of claim 19, further comprising:
performing an additional dump operation to complete the dumping of the data after the second timeout expires in response to the at least one of the first and second flash memory devices being reset.

* * * * *